May 21, 1957 W. C. HIRONIMUS 2,793,039

TAPE RECORDER AND PLAYBACK DEVICE

Filed April 24, 1952 8 Sheets-Sheet 1

INVENTOR.
WALTER C. HIRONIMUS

BY Ostrolenk & Faber
ATTORNEYS

TAPE RECORDER AND PLAYBACK DEVICE

Filed April 24, 1952

INVENTOR.
WALTER C. HIRONIMUS
BY
Ostrolenk & Faber
ATTORNEYS

May 21, 1957 W. C. HIRONIMUS 2,793,039

TAPE RECORDER AND PLAYBACK DEVICE

Filed April 24, 1952 8 Sheets-Sheet 3

INVENTOR.
WALTER C. HIRONIMUS

BY

Ostrolenk & Faber

ATTORNEYS

TAPE RECORDER AND PLAYBACK DEVICE

Filed April 24, 1952

INVENTOR.
WALTER C. HIRONIMUS

BY
Ostrolenk & Faber
ATTORNEYS

INVENTOR.
WALTER C. HIRONIMUS

BY
Ostrolenk & Faber
ATTORNEYS

May 21, 1957 W. C. HIRONIMUS 2,793,039

TAPE RECORDER AND PLAYBACK DEVICE

Filed April 24, 1952 8 Sheets-Sheet 6

INVENTOR.
WALTER C. HIRONIMUS

BY

Ostrolenk & Faber

ATTORNEYS

TAPE RECORDER AND PLAYBACK DEVICE

Filed April 24, 1952 8 Sheets-Sheet 7

INVENTOR.
WALTER C. HIRONIMUS

BY Ostrolenk & Faber
ATTORNEYS

May 21, 1957 W. C. HIRONIMUS 2,793,039

TAPE RECORDER AND PLAYBACK DEVICE

Filed April 24, 1952 8 Sheets-Sheet 8

INVENTOR.
WALTER C. HIRONIMUS
BY
Ostrolenk & Faber
ATTORNEYS

United States Patent Office 2,793,039

Patented May 21, 1957

2,793,039

TAPE RECORDER AND PLAYBACK DEVICE

Walter C. Hironimus, Charlotte, Mich., assignor to Wilcox-Gay Corporation, Charlotte, Mich., a corporation of Michigan Application April 24, 1952, Serial No. 284,073

7 Claims. (Cl. 274—4)

My present invention relates to a tape recorder and play back device and more particularly it relates to a push button mechanism for operating a tape recorder and play back device.

Up to the present time tape recorder and play back devices, hereinafter referred to as tape recorders, were provided with a single switch having generally three positions, a central position for stop, a side position for reverse and another side position for forward.

If, for example, it was desired to record information on the tape of such a tape recorder, the tape was first placed so that it would pass through the magnetic recording device and then the switch moved to the forward position. A system of clutches connected with the switch would make the tape reels move slowly during this recording operation.

If, on the other hand, it was desired to play back the information recorded, it was first necessary to move the switch in the position reverse, at which position the reel would be slowly moved in the reverse direction.

After this operation, the switch was moved to the forward position passing through the intermediate or stop position. When on the other hand it was desired to move the tape quickly in either the reverse or the forward position, a readjustment of the tape in the tape recorder mechanisms was necessary, involving therefore a considerable amount of adjustments.

Furthermore, in the prior art in order to record information on previously used tapes it was first necessary to pass the tape through an erasing mechanism and then use the tape for the recording operation.

My present invention overcomes the above-mentioned difficulties providing push button controls for fast reverse, fast forward motion of the tape, for record, for play back and for stop. It further provides an arrangement of the erasing head so that the operation of erasing previous information from a tape is made as the tape moves for the recording operation.

My push buttons are also provided with mechanical apparatus so that when the fast reverse and fast forward push buttons are pressed down, neither the recording operation nor the play back operation can take place.

Furthermore, when either the fast reverse or the fast forward push buttons are pressed down, either the stop button or the inoperative button can release the button that is pressed down, the recording and the play back buttons being locked in their inoperative position until the stop button is depressed.

When the record or play back button is pressed down, the stop button, the fast forward button and the fast reverse button can all release the record button or the play back button. On the other hand, when the fast forward or fast reverse buttons are in the operative position, only the inoperative button or the stop button may release them. This is necessary to prevent tape spillage which would occur if the tape movement were suddenly slowed by the introduction of the tape speed controlling mechanism.

Essentially my novel tape recorder consists of a series of push buttons having common mechanisms so that any button or key can release any other button if this other button if this other button is not locked. The push buttons engage extensions of various members. The fast reverse and fast forward buttons can move a member which serves to lock the record and play back buttons. The stop key or push button can release the reverse and forward buttons and moves a braking member to stop the rotation of the tape reels. The record push button makes the erasing head and the recording head operative when pressed, also providing a good contact engagement between the tape and recording head. The record push button also operates a rotatable member of my novel tape recorder so that an idler carrying the tape may bear with a certain amount of pressure against a constant speed capstan to control the speed of motion of the tape when the record push button is pressed down.

A similar operation occurs when the play back push button is pressed down, the only difference being that the erasing head is not operative when the above-mentioned push button is operative.

The main object of my present invention is the provision of means whereby a tape recorder may be operated by push button mechanisms.

Another object of my present invention is the provision of means whereby preselected push buttons are locked inoperative when some other push buttons are in the operative position.

A further object of my present invention is the provision of means whereby any push button may release any other push button unless this other push button is locked inoperative.

Still another object of my present invention is the provision of means whereby the recording operation is performed immediately after the erasing operation without the need for first completely erasing the tape and then performing the recording operation.

When it is desired to move the tape reels at relatively high speed in both the forward and reverse direction, a forward button or a reverse button may be pressed down.

Assuming first that the forward button is pressed down, a swinging belt driven pulley moves to engage the driving reel drum and since this pulley is driven by the motor through its belt, the driving reel will be coupled to the motor shaft through the pulley and rotated in the correct direction at a relatively great speed.

When the fast reverse button is pressed, this pulley moves toward the second tape reel drum and thus bears against an intermediate idler positioned between the pulley and the second drum. The main motor continues to rotate in the same direction but because of introduction of the idler between the pulley and the second drum, the second drum now rotates in the direction opposite to the one in which the first drum was moving when the forward key was pressed down. In this case then, the second drum will rotate at a relatively high speed in a direction opposite to the previously mentioned one and cause the tape, therefore, wound on the tape reel drum to move in the opposite direction.

Another object of my present invention is, therefore, a simple method for fast forward and fast reverse motion of the tape.

A further object of my present invention is the provision of means whereby all clutches previously used for changing the speed of the tape are eliminated.

It was previously mentioned that when the stop button is pressed down, self-energizing brakes bear against the drums of the tape reels causing the drums to stop their rotation and at the same time disconnecting the motor from the rotatable members of my novel tape recorder. The self-energizing brakes are so designed that they will produce greater braking action on the tape reel drum which at the stopping time was being driven by the tape. In other words, my novel self-energizing brakes are so constructed that one acts and one over-rides depending on the rotation of the drum. This is the main cause for not spilling the tape during the operation of my novel tape recorder.

Another object of my present invention is the provision of self-energizing brakes whereby one acts and one over-rides depending on the rotation of the tape reel drums.

The foregoing and many other objects of my invention will become apparent in the following description and drawings in which.

Figure 1:
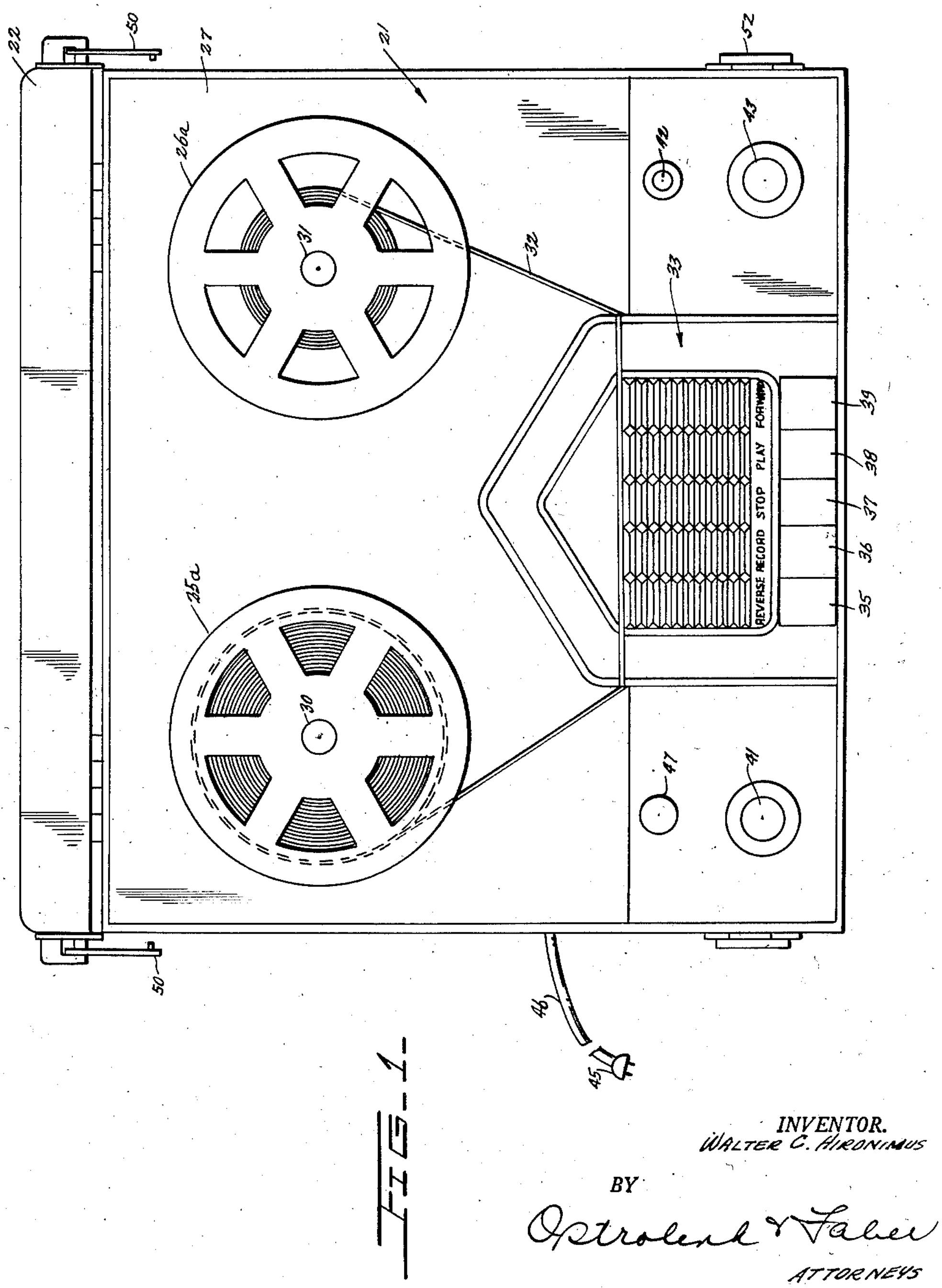
Figure 1 is a top view of my novel tape recorder.

Referring first to Figure 1 showing the tape recording and play back device, hereinafter referred to as the tape recorder, of my invention, all the mechanical and electric elements of the tape recorder 20 are mounted in a cabinet or housing 21 provided with a cover 22 for completely enclosing in cooperation with housing 21 the above-mentioned mechanical and electrical elements of tape recorder 20.

Tape reels **25*a* and 26*a* are located above the upper surface 27 of housing 21. Tape reels 25*a* and 26*a* are actually mounted on shafts 30 and 31, respectively, with which they can move in rotational motion. The tape 32 itself is here shown partly rolled on reel 25*a* and part on roll 26*a* and passing through the interior of raised portion 33. Under surface 27 in correspondence with reels 25*a* and 26*a* are drums 25 and 26 (see Figure 2) movable with reels 25*a* and 26*a***.

Also, below upper surface 27 of housing 21 there are also located the electrical and mechanical controls, hereinafter described, of tape recorder 20.

More precisely, a series of push buttons consisting of a "reverse" push button 35, a "record" push button 36, a "stop" push button 37, a "play" push button 38 and a "forward" push button 39 is located on surface 27 of housing 21.

Furthermore, a sound volume knob 43, a recording indicator lamp 42 and tone knob 41 are located on the same surface 27 of housing 21. A plug 45 for connecting the tape recorder 20 to an electric power line is connected to an electric conductor 46 which passes through the back portion of housing 21 of tape recorder 20. Surface 27 of housing 21 is also provided with an input jack opening 47 to permit the connection of a microphone into the tape recorder for recording operations.

Cover 22 is also provided with appropriate locking means 50 for releasably securing cover 22 to housing 21 when it is desired to completely close tape recorder 20. Locking means 50 of cover 22 engage their corresponding stationary members 52 on housing 21 at this closed position in a manner well-known in the art.

Figure 2:
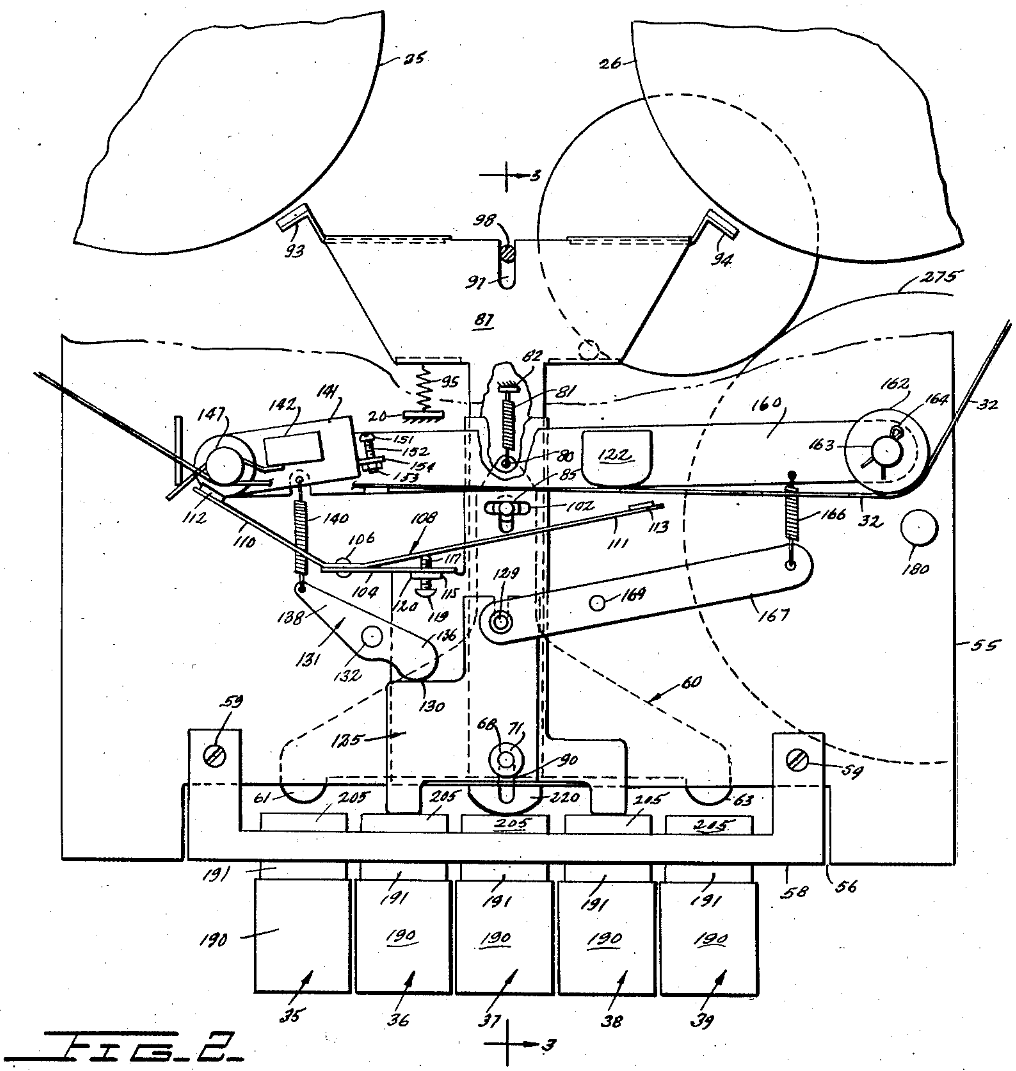
Figure 2 is a schematic view of the push buttons and their associated mechanisms with the tape recorder in its neutral or inoperative position.
Figure 3:
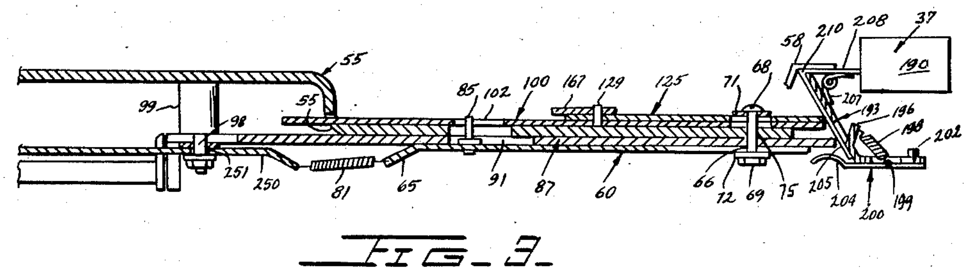
Figure 3 is a cross-sectional view of the tape recorder of Figure 2 taken on line 3—3 looking in the direction of the arrows.
Figure 11:
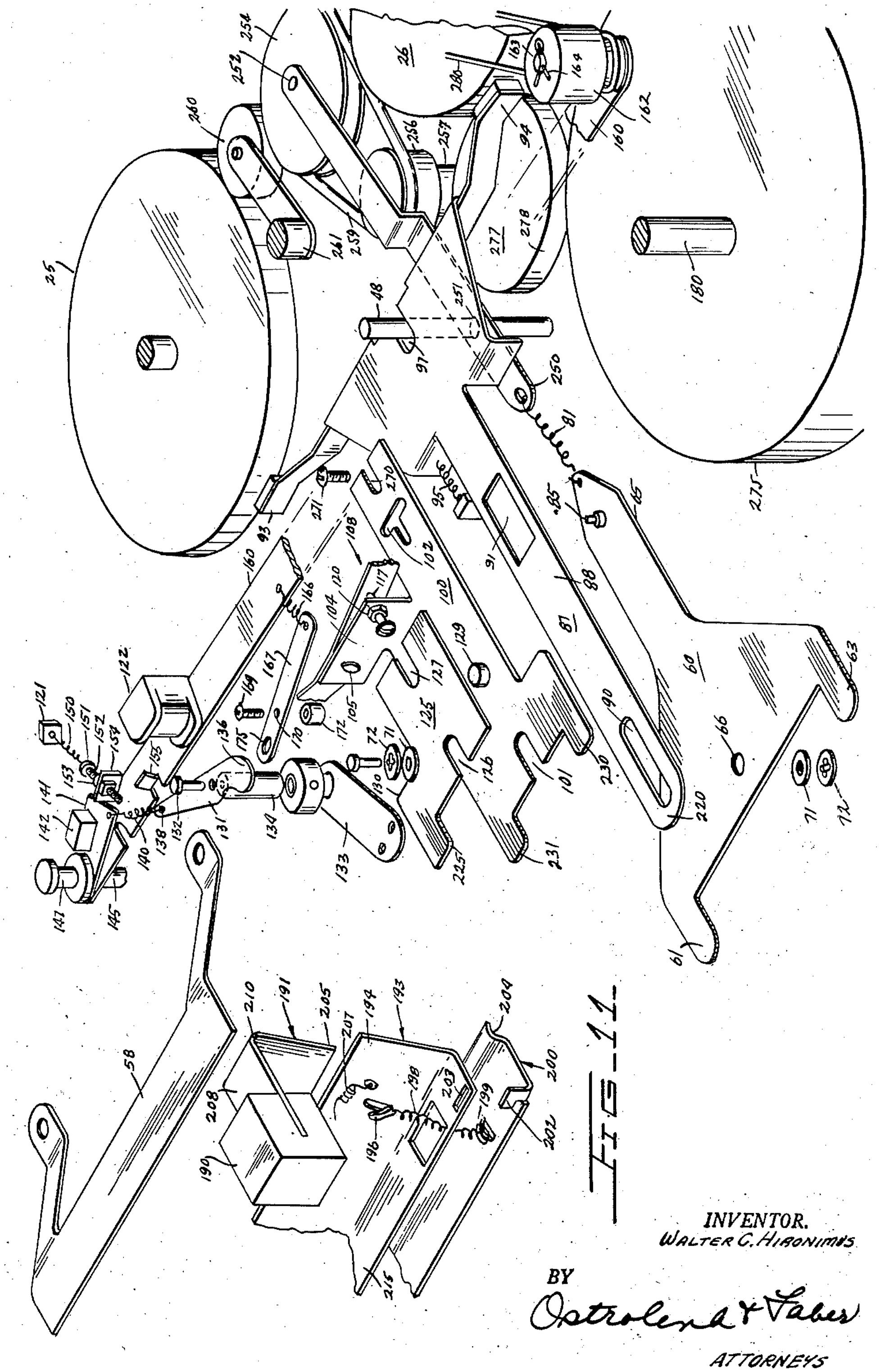
Figure 11 is an exploded view of my novel tape recorder.

Referring now to Figures 2, 3, and 11 showing, repectively, a plan view, a sectional view and an exploded view of my tape recorder in its "idle" position, that is, in a position in which all push buttons 35, 36, 37, 38, 39 are in the inoperative or raised position, the previously mentioned raised portion 33 is actually a one-piece plastic casting separate from base plate 21 mounted in any suitable way on the upper surface 27 of housing 21. Base plate 21 has a recess 56 in which push buttons 35 to 39, inclusive, are mounted. A Z-shaped member 58 is secured by means of bolt and nut means 59 to cover 55 to bridge recess 56 and to perform a function hereinafter described.

A Y-shaped member 60 having two small parallel extensions 61 and 63 and a large centrally located extension 65 is provided with an opening 66 engaged by a boss 68 having washers 71 and retaining washers 72. Boss 68 also engages through an appropriate opening 75 in cover 55 so that Y-shaped member 60 can rotate around boss 68 but cannot move in translational motion with respect to cover 55.

Extension 65 of Y-shaped member 60 is provided at its tip with an opening 80 engaged by one end of a spring 81, the other end of spring 81 being connected to a member 250 pivoted at opening 251 engaged by pin 98. Member 250 is provided at its other end with a pin 252 which serves as the shaft for pulley 254 rotatable by larger diameter portion 256 of shaft 257 of the motor (not shown) of the tape recorder through belt 259.

When Y-shaped member 60 is moved counterclockwise as described hereinafter, pulley holding member 250 will rotate around its pivot 98, thus causing idler pulley 254 to come into contact with the rim of the drum 26 through rubber belt 259.

Assuming that the motor (not shown) rotates in the clockwise direction, then portion 256 of shaft 257 of the motor will also rotate in a clockwise direction and so will pulley 254 causing, therefore, drum 26 to rotate in the counterclockwise direction.

Because of the particular type of coupling and the dimensions of shaft portion 256, pulley 254 and drum 26, it is seen that when the motor rotates at a certain preselected speed, drum 26 will also rotate in the opposite direction at a slower but very close speed with respect to the speed of the motor.

When Y-shaped member 60 is moved from its center position in the clockwise direction, idler carrying member 250 will rotate around pin 98 to move pulley 254 in the direction of the other drum 25. Pulley 254 will then come into engagement with a second idler 260 rotatable around pin 261 and connected to pin 261 through arm 263.

When, therefore, Y-shaped member 60 is moved in the clockwise direction, pulley 254 will bear against second idler 260 and second idler 260 will in its turn gear against the rim of drum 25. If the motor (not shown) rotates still clockwise as previously mentioned, pulley 254 will also rotate clockwise but now because of the interposition of second idler 260, drum 25 will rotate also in the clockwise direction.

In this case, drum 25 will rotate at a relatively high speed in the clockwise direction causing the tape 32 wound on reel **25*a* and reel 26*a* to move from reel 26*a* to reel 25*a* which in the present embodiment corresponds to reverse motion of reel 32**.

Pin 261 of second idler 260 is rigidly secured to housing 21 of tape recorder 20. Y-shaped member 60 is also provided near the opening 80 of extension 65 with a pin 85 whose use will be hereinafter described.

A T-shaped member 87 is mounted above the Y-shaped member 60. T-shaped member 87 is provided at its center leg 88 with two slots 90 and 91 which permit translational motion of T-shaped member 87 in a direction parallel to the direction at which extension 65 of Y-shaped member 60 is biased. In other words, slot 91 is for clearance for pin 85 carried by Y-shaped member 60. T-shaped member 87 performs a braking function and carries, therefore, self-energizing brakes 93 and 94 on each side arm of its T structure. Brakes 93 and 94 serve to stop the motion of tape reels 25a and 26a, respectively, in a manner which will hereinafter be described.

T-shaped member 87 is also biased toward its inoperative position, that is, toward the position at which brakes 93 and 94 are farthest from reel drums 25 and 26 by means of a spring 95 secured on one side to T-shaped member 87 and at the other to the housing 21 of the tape recorder 20. Since only one spring 95 is used to so bias T-shaped member 87, T-shaped member 87 is provided at its top portion with an open slot 97 which engages at all times pin 98 which is actually a part of the base plate 21.

It is seen that when the width of slot 97 is approximately equal to the diameter of pin 98, member 87 although biased in one direction by spring 95 will not be able to rotate but will be able to move in a translational motion with respect to pin 98. Of course, the slot 90 is also engaged by pin 68 while pin 85 can move in slot 91 without interfering with the motion of T-shaped member 87.

Above T-shaped member 87 is mounted the "play" operating member 100 which is provided at one end with an open slot 101 and at the center with a T-shaped slot 102 and at the other end with open slot 270 where slot 101 is engaged by pin 68 while slot 102 is engaged by pin 85 carried by Y-shaped member 60 in apparatus hereinafter described, and slot 270 is engaged by pin 271.

Member 100 has a raised portion 104 provided with one opening 105 aligned with another opening 106 of pad holding member 108. A rivet passing through openings 105 and 106 on members 100 and 108, respectively, rigidly secures member 108 to raised portion 104 of member 100. Pad holding member 108 is V-shaped and carries at its outer ends 100 and 111 two pads, one on each side, 112, 113, respectively.

Extension 104 of member 100 is provided with a second opening 115 engaged by extension 117 of the bolt 119 having a nut 120. Extension 117 serves to decrease the angle between arm 110 and arm 111 of V-shaped pad holding member 108. In other words, bolt 119 performs the function of increasing or decreasing the pressure which pad 113 exerts on the tape 32 as it passes the magnetic head 122 so that no transverse play of tape 32 is allowed and optimum conditions for play back or recording are obtained. Member 100 is also provided with extensions 230 and 231.

Further above member 100 is "record" member 125. It is here necessary to mention the fact that while members 100 and 125 are above surface 21, members 60 and 87 are below surface 21 and that, therefore, surface 21 must be provided with appropriate openings through which, for example, pin 85 and boss 68 may pass from one side to the other of surface 21.

"Record" member 125 is also provided with an open slot 126 at one end and another open slot 127 at the other end. Slot 126 is engaged by boss 68 while slot 127 is engaged by a pin 129 rigidly mounted on play member 100. Member 125 is shaped to have a shoulder 130 which engages a centrally pivoted member 131 rotatably secured to housing 21 of tape recorder 20 by means of a shaft 132 passing through housing 21 and carrying on its other end a lever 133 for switching the amplifier (not shown) of the tape recorder 20 in a well-known way.

More specifically, shoulder 130 engages at all times extension 136 of member 131. On the other side 138 of member 131 is connected a spring 140 which carries at its other end a support 141 for the erasing head 142. Support 141 is rotatably mounted on a shaft 145 which carries also tape guide 147.

The function of spring 140 is to bias extension 136 of member 131 against shoulder 130 of record member 125 and also as a means for moving in rotational motion erasing head 142 when member 131 is rotated in a counterclockwise direction by translational movement of shoulder 130 of record member 125.

Erasing head 142 is biased in its inoperative position by means of a spring 150 secured on one side to housing 21 of tape recorder 20 and on the other to the head 151 of a bolt 152 which engages a nut 153 and a raised extension 154 of support 141.

When the tape recorder 20 is in the position shown in Figure 2, that is inoperative, the tension produced by spring 150 is greater than that produced by spring 140 so that the erasing head 142 together with its support 141 form an angle with respect to the magnetic means supporting member 160.

When, on the other hand, the tape recorder 20 is in the position shown in Figure 4 which will be described more in detail hereinafter, the tension of spring 140 is made greater than that of spring 150 so that support 141 together with erasing head 142 are rotated clockwise with respect to the position described above to be essentially parallel to the magnetic means supporting member 160 and with the erasing head 142 contacting the tape 20.

To stop the above-described clockwise rotation of supporting member 141 under action of spring 140, a stop member 155 is raised from supporting member 160 in alignment with bolt 152 so that at the end of a preselected amount of rotation the extending portion of bolt 152 will hit raised stop member 155, thus stopping the rotation of erasing head supporting member 141.

Magnetic means supporting member 160 is also rotatably mounted in any suitable way on shaft 145. On this supporting member 160 is mounted recording head 122 and supporting member 160 is also provided at the end opposite the one in which it is pivoted with an idler roller 162 rotatably mounted on a shaft 163 rigidly secured to supporting member 160. A cotter pin 164 serves to keep roller 162 from moving in an axial motion with respect to shaft 163.

Supporting member 160 is also provided near roller 162 with a spring 166 which engages at its other end an arm 167 rotatably secured to housing 21 of tape recorder 20 by means of a bolt 169 engaging an opening 170 of arm 167, the housing 21 of tape recorder 20 and an end 172. Arm 167 is provided at the end opposite the end at which spring 166 is secured with a circularly shaped opening 175 which engages pin 129 of play member 100 at that portion of pin 129 which extends beyond and above record member 125.

Mounted also on housing 21 of tape recorder 20 is a fly wheel 275 having a capstan 180 which extends through surface 55 of tape recorder 20 close to idler roller 162. Fly wheel 275 is rotated by shaft 257 of the motor of the tape recorder through an idler roller 277 whose rim 278 is in engagement with both fly wheel 275 and shaft 257.

Because of the interposition of idler roller 277, a clockwise rotation of motor 257 causes a similar clockwise rotation of fly wheel 275 and, therefore, of capstan 180 of fly wheel 275. Capstan 180 of fly wheel 275 when engaged by roller 162 as shown in Figure 4, the tape 32 being interposed between roller 162 and capstan 180, will determine with its speed and the speed of roller 162 the forward movement of tape 32 during the record or play back operation.

All the above-described members 60, 87, 100, 125 are operated by means of push buttons 35, 36, 37, 38, 39, These push buttons, of which one is shown in an exploded view in Figure 11, consist of a block 190 carrying a V-shaped member 191. Mounted centrally with respect to the V-shaped member 191 is another angularly shaped member 193 having a raised portion 194 which engages the apex of member 191 so that member 191 can rotate with respect to member 193. Member 193 is secured in any suitable way to the housing 21 of tape recorder 20. Member 193 is provided with a raised finger 196 engaging one end of spring 198. The other side of spring 198 engages another raised finger 199 of a movable member 200.

Member 200 is provided with a raised extension 202 which engages an opening 203 in angularly shaped member 193 to permit only the rotation of member 200 with respect to member 193 but not translation. Member 200 is so shaped at the end opposite the one at which it is hinged on member 193 so as to have a circularly shaped extension 204 which can be engaged by extension 205 of the V-shaped member 191. A coil spring 207 placed between section 208 of V-shaped member 191 and raised portion 194 of member 193 serves to bias section 208 away from raised extension 194 of member 193.

It is quite evident that there will be one block 190, one V-shaped member 191 for each of the above-described push buttons 35, 36, 37, 38, 39. Members 193 and 200, on the other hand, are common to all the push buttons. It is also necessary to mention the fact that in its inoperative position section 208 of V-shaped member 191 bears under action of spring 207 against bridge member 58 and, therefore, serves to hold the movable parts of push buttons 35, 36, 37, 38, 39 in a certain preselected position when inoperative. This same bridge member 58 also serves to permit rotation of member 191 around its apex 210 without permitting any translational movement of member 191 and, therefore, of block 190 of push button 35 or 36 or 37 or 38 or 39.

It is now possible to describe the operation of my novel tape recorder.

Figure 10:
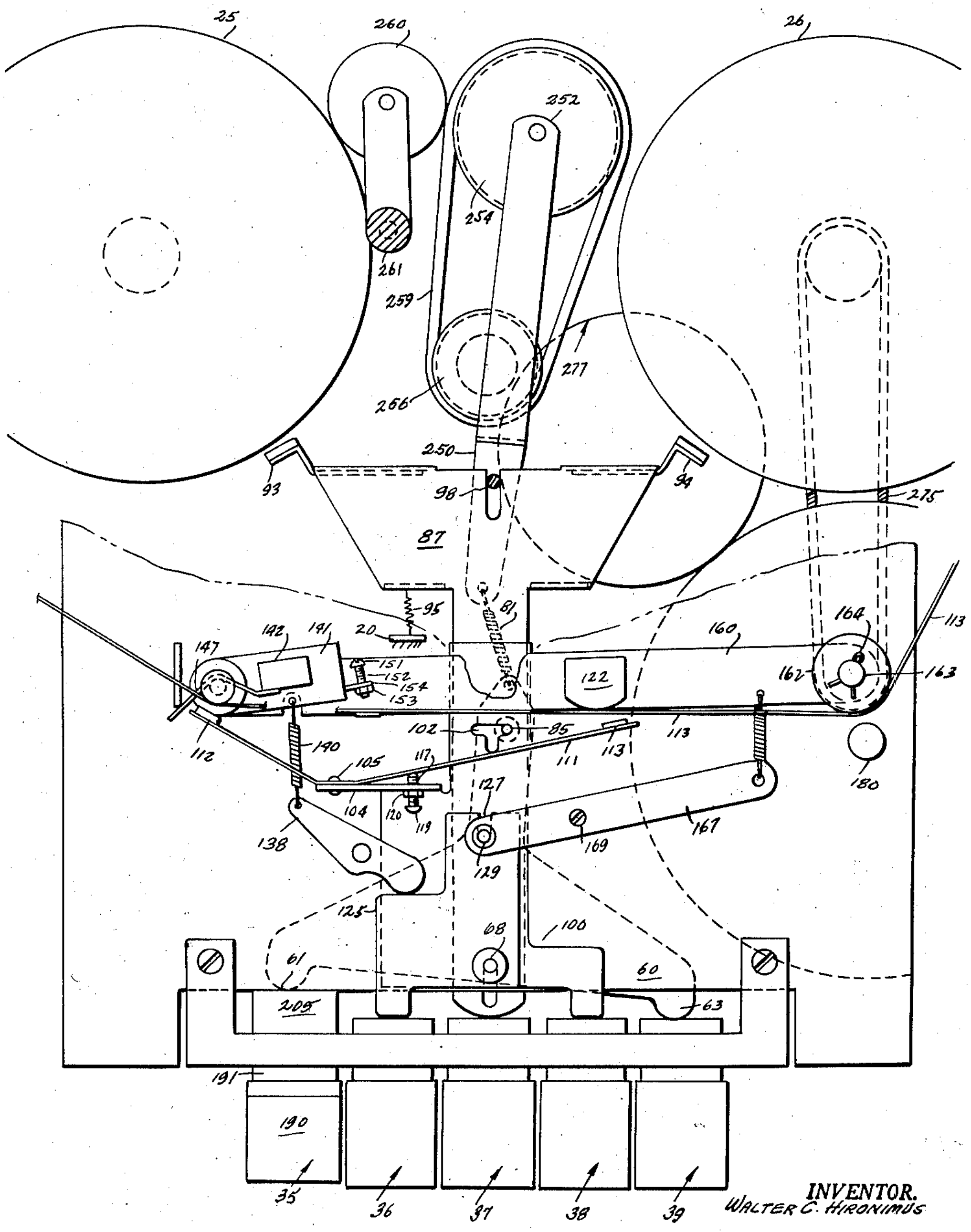
Figure 10 is another schematic view of my novel tape recorder showing it in its fast reverse position.

Referring, in fact, to Figures 2, 10 and 11, it is seen that when push button 35 is moved from the inoperative position shown in Figure 2 to its operative position shown in Figure 10, in other words, when block 190 of push button 35 is pushed downwardly, extension 205 of V-shaped member 191 engages arm 61 of Y-shaped member 60, thus producing a rotation of Y-shaped member 60 around boss 68 against the bias of spring 81 to carry Y-shaped member 60 in the position shown in Figure 10.

Pin 85 carried by Y-shaped member 60 will, therefore, move to the right-hand side of T-shaped slot 102. When pin 85 is in this position in T-shaped slot 102 it will be impossible to move in translational movement both members 100 and 125 which are both locked by the position of pin 85 in slot 102.

More particularly, play member 100 will not be able to move in a translational movement because of the position of pin 85 in the right-hand side of T-shaped slot 102 while record member 125 will also be incapable of moving because of the position of pin 129 carried by play member 100 in open slot 127 of record member 125. Pin 129 in this position will be at the bottom of slot 127 so that no motion in a generally forward direction is permitted of member 125 by pin 129.

Since members 100 and 125 are thus locked, their corresponding push buttons 38 and 36, respectively, will also be locked. In other words, it is impossible to operate push buttons 36 and 38 when the reverse push button 35 is in the operative position.

Referring now to Figure 10, when Y-shaped member 60 is moved in the position shown in Figure 10, pulley operating member 250 is rotated around pin 98 so that pulley 254 will engage idler 260 through belt 259 and cause idler 260 to bear against tape reel drum 25. Since shaft 256 is rotated by the motor (not shown) for example in the clockwise direction, because of the insertion of idler 260 between drum 25 and pulley 254, drum 25 will rotate in the same direction as shaft 256 of the tape recorder motor. The tape carrying reel 25*a* rotatable together with drum 25 will then also rotate in the clockwise direction or better in the direction of the tape recorder motor and cause tape 32 to be wound on tape reel 25*a*.

It is now evident that when reverse push button 35 is pressed down, push buttons 36 and 38 will be locked and at the same time tape reel 25*a* will be rotated in the same direction of the tape recorder motor (not shown) at a relatively high speed through rotation of idler 260 and idler pulley 254.

Also, as previously mentioned, capstan 180 is not made operative since support member 160 is not rotated by the operation of push button 35. Therefore, tape 32 can move at a relatively high speed for this reverse motion.

Figure 8:
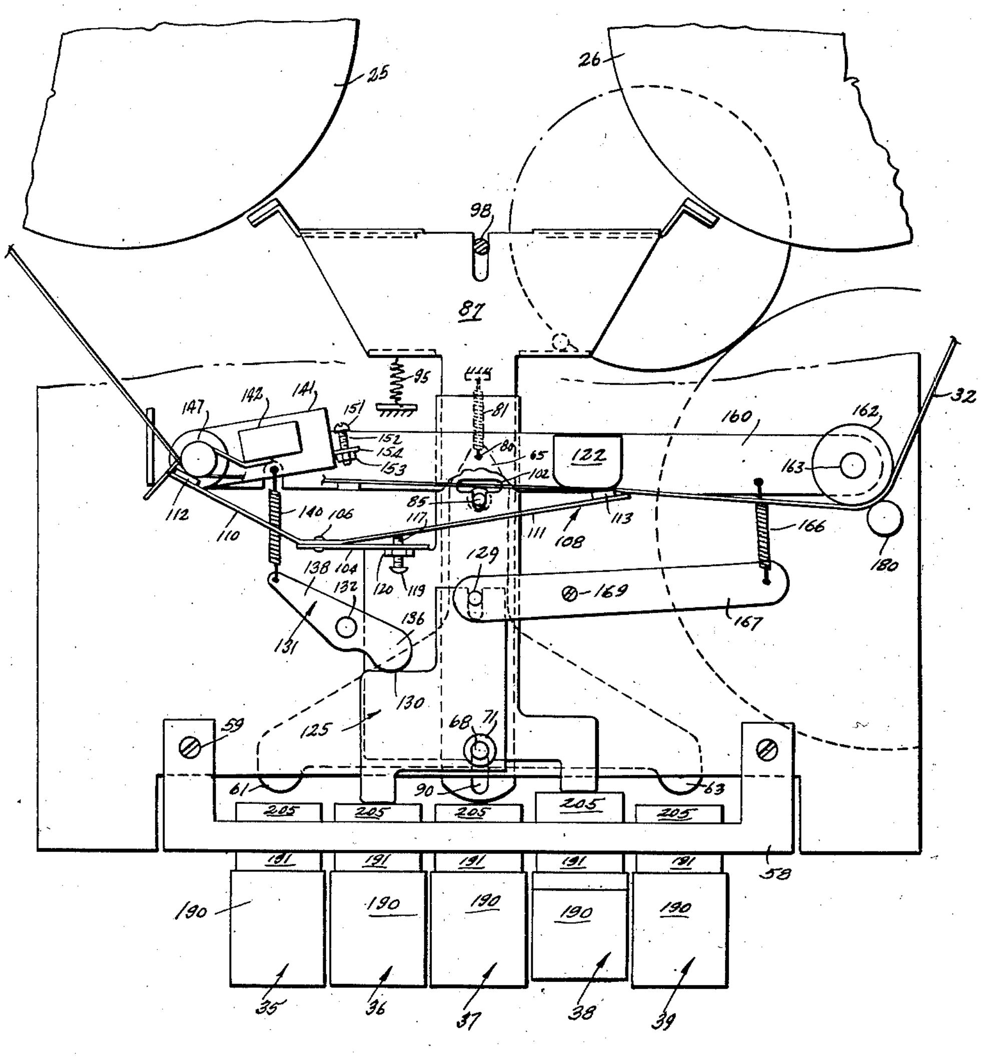
Figure 8 is another schematic view of my novel tape recorder showing it in its play back position.

If now forward key 39 is pressed down (see Figure 9), Y-shaped member 60 will move in the opposite direction around boss 68 so that pin 85 will pass from the right-hand side of T-shaped slot 102 in member 100 as shown in Figure 8. This motion, of course, is made against the biasing action of spring 81. Spring 81 centers arm 250 and maintains the arm 250 and belt 259 in intermediate position; either drum 25 or drum 26 is rotated by belt 259 when, respectively, either button 35 or button 39 is depressed.

When Y-shaped member 60 is in this position, members 100 and 125 are locked in a manner similar to the one described above so that push buttons 36 and 38 corresponding to record and play are all locked in their inoperative positions. Since push button 39 corresponds to the fast forward motion of tape 32 when push button 39 is pressed down, through the action of spring 81 member 250 will rotate around its pivot 98 and move pulley 254 from the position of Figure 10 to the position of Figure 9 in which pulley 254 is in engagement with the rim of drum 26 through belt 259.

Since pulley 254 is driven by shaft 256 of the tape recorder motor through belt 259, drum 26 driven by pulley 254 through belt 259 will rotate in the direction opposite to the direction of rotation of the tape recorder motor. In this case then, drum 26 will rotate in the counterclockwise direction since it was assumed that the motor of the tape recorder (not shown) rotated in the clockwise direction.

Tape reel 26*a* associated with drum 26 will then also rotate in the counterclockwise direction and, therefore, cause tape 32 to be wound on tape reel 26*a* at a relatively fast rate since drum 26 is rotated by shaft 256 of the tape recorder motor through pulley 254 and belt 259.

Figure 9:
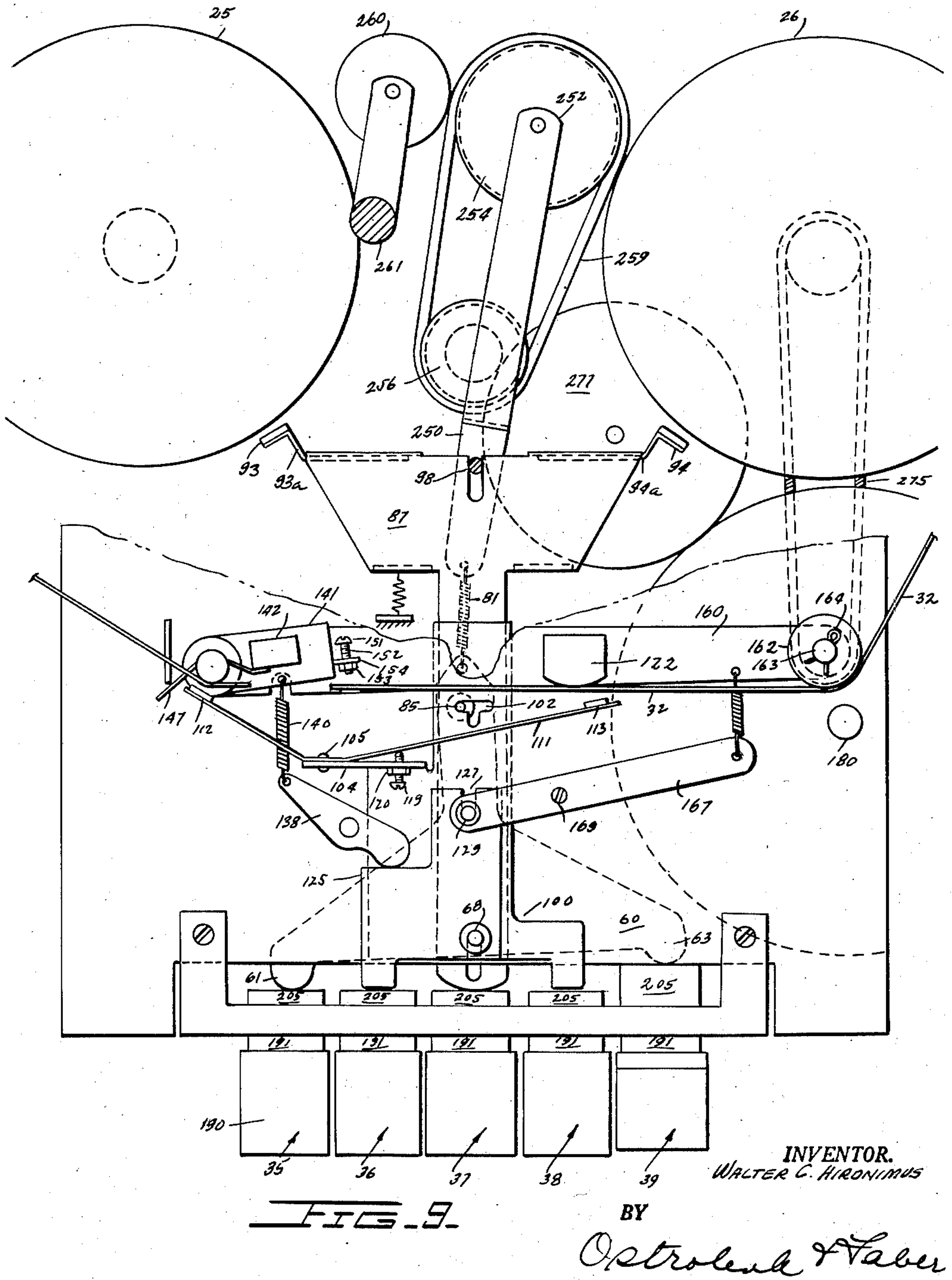
Figure 9 is a schematic view of my novel tape recorder showing it in its fast forward position.

When pulley 254 moves from the position shown in Figure 10 to the position shown in Figure 9 through the operation of push button 39, idler 260 will be positioned loosely between drum 25 and pulley 254 and, therefore, will be unable to rotate drum 25.

If, referring both to Figures 9 and 10, it is desired after the operation of either push button 39 or push button 35 to stop the motion of tape reel 32, it is only necessary to push stop push button 37. The detailed operation of the tape recorder when push button 37 is pressed down will be described hereinafter in connection with Figure 7, but it is desired to point out at this point that if push button 37 is pressed down when the tape is going in the forward direction at a relatively fast rate, or in other words when push button 37 is pressed down after push button 39 has been pressed down, self-energizing brakes 93 and 94 will be moved against the rims of drums 25 and 26 in a manner described hereinafter in connection with Figure 7.

Since drum 26 rotates in the counterclockwise direction, the action of brake 94 on drum 26 is of relatively low intensity because of the particular shape of the brake holding member 94*a*.

It is to be pointed out that drum 26 is the drum that is being driven when push button 37 is pressed down. Drum 25, on the other hand, will rotate freely since it is only driven by the unwinding motion of tape 32 in tape reel 25a associated with drum 25.

If the two drums 25 and 26 were provided with previously used brakes it would be seen that since drum 25 is not the driven drum, a sudden braking action on drum 26 accompanied by a similar action on drum 25 where the intensities of the brakes are the same would produce a spilling over of the tape 32 due to the fact that drum 25 will continue to rotate silightly even after the brakes have been applied.

In my novel tape recorder, on the other hand, brake 93 and its holder 93a are so constructed that when drum 25 rotates in the counterclockwise direction driven by tape 32 on tape reel 25a, a considerably greater braking action will be applied by brake 93 on drum 25 since now brake 93 because of the particular structure of its holder 93a will operate as a self-energizing brake or a brake in which rotation of drum 25 would only tend to increase the braking action of brake 93.

A similar action will occur when stop push button 37 is operated after push button 35 has been pressed down.

To summarize the above, it is thus seen that brakes 93 and 94 are self-energizing only in one direction, brake 93 when drum 25 is rotated counterclockwise, brake 94 only when drum 26 is rotated in a clockwise direction. It is obvious that this aids greatly in preventing spillage of tape 32 since in each case the feed drum has the greater brake action.

Again since support 160 is not moved by operation of push button 39 toward capstan 180, the tape 32 can move at a relatively high speed to be wound on tape reel 26a.

It is also necessary to point out that when button 39 is pressed down, button 35 will be released from its downward position to regain its inoperative position as shown in Figure 2. This is made possible by the combined action of V-shaped member 191, circular section 204 of member 200 and angularly shaped member 193.

Figure 5:
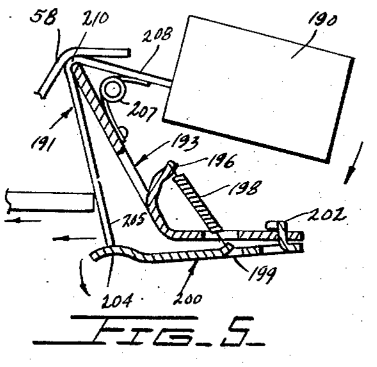
Figure 5 is a detail view of my novel push button release and latch mechanism when the push button is in the intermediate position.
Figure 6:
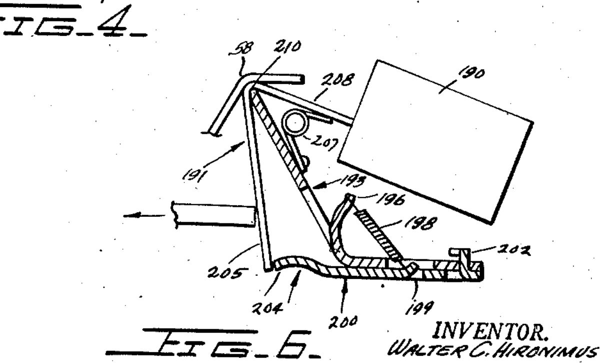
Figure 6 is a detail view of my novel push button release and latch mechanism when the push button is in latched condition.

More particularly, referring to Figures 5 and 6, when push button 35 is pressed down, the relative positions of members 191, 200 and 193 are thus shown in Figure 6. If now push button 39 is pressed down not only will it perform the above-described operations, but it will cause V-shaped member 191 to rotate around its apex 210 in a clockwise direction as shown in Figure 5 against the bias of the coil spring 207.

Rotation of V-shaped member 191 is made possible as previously mentioned by applying a pressure on block 190 and V-shaped member 191 can rotate around its apex 210 since the apex engages the bent portion of bridge member 58 at one side and the raised portion 194 of angular member 193 at the other side as shown in the figures.

Rotation of V-shaped member 191 causes its extension 205 to move from the position shown in Figure 3 to the position shown in Figure 5 where portion 205 of member 191 bears against the curve shaped portion 204 of member 200, causing member 200 to rotate with respect to the base 215 of member 193 against the bias of spring 198.

As previously mentioned, members 193 and 200 are common to all the push buttons 35—39 so that when member 200 is rotated in a counterclockwise direction by motion of extension 205 of member 191 produced by the operation of push button 39, V-shaped member 191 of push button 39 will be released from its latch engagement with its corresponding portion of curve shaped section 204 of member 200, thus causing push button 35 to return to its original position since now spring 207 of push button 35 is free to rotate and, therefore, to rotate V-shaped member 191 of push button 35 and with it block 190 of push button 35 to its original inoperative position as shown in Figure 3.

Of course, the push button shown in Figure 3 is actually the stop push button 37 and not 35 or 39 but since all the push buttons are similarly constructed, the inoperative position of push buttons 35 and 39 will be the same as that of push button 37.

Now as push button 39 is pressed further down from the position of Figure 5, all the operating parts will be placed as shown in Figure 6. In other words, extension 205 of V-shaped member 191 will now be latched in push button 39 operative position by engagement of extension 205 with the end of bent portion 204 of member 200 as shown in Figure 6 where, of course, member 200 has returned to its original position under action of spring 198.

From the above description it is seen that the operation of any of the five push buttons will cause the other four to be released from their positions and, therefore, will cause them to return to their inoperative position. In other words, by this arrangement only one push button can be in its operative position at any one time.

Figure 7:
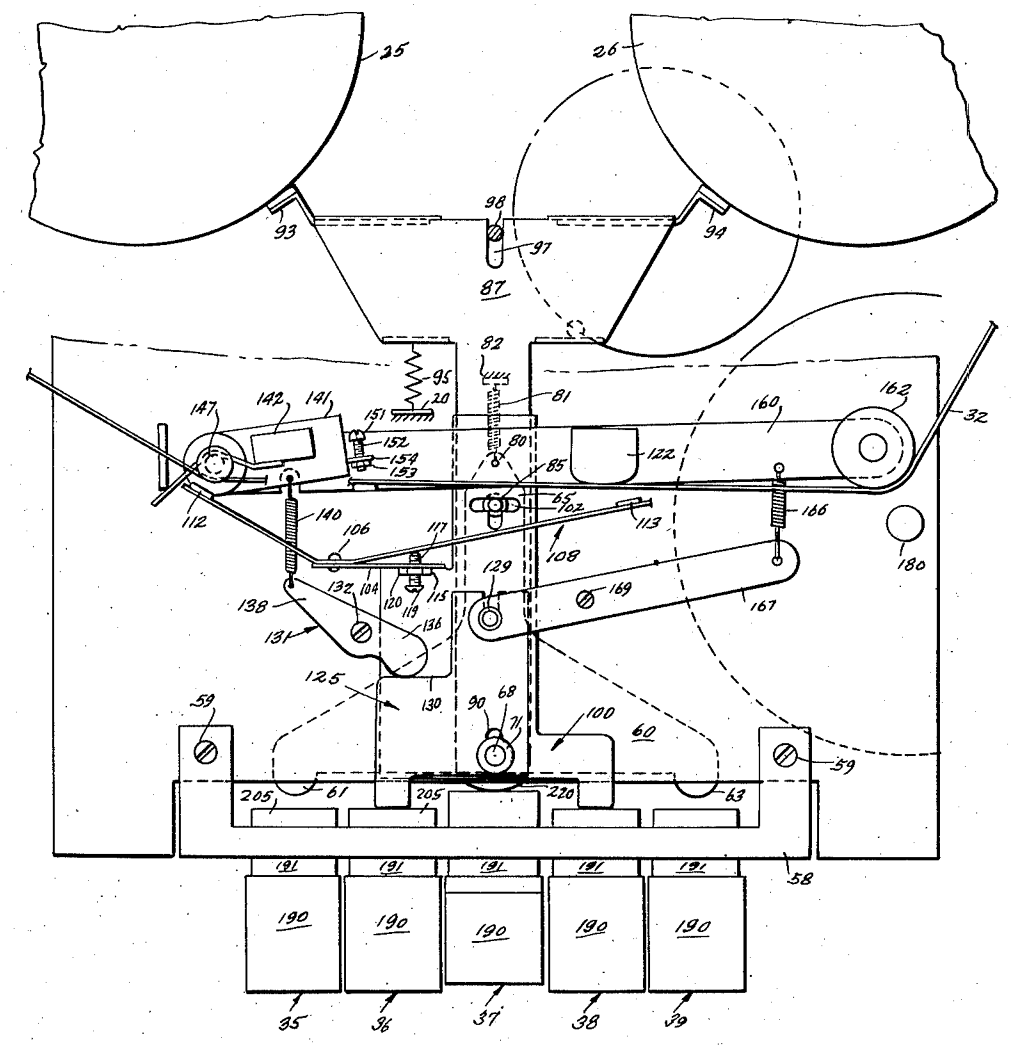
Figure 7 is another schematic diagram of my novel tape recorder showing it in the stop position.

Referring now to Figure 7 and 11, when stop push button 37 is pressed down and assuming that my novel tape recorder was originally with key 39 pressed down, the following events will occur as stop push button 37 is pressed down.

When push button 37 is pressed down, it will cause first of all the release of push button 39 from its operative position to its inoperative position. At the same time, extension 205 of V-shaped member 191 will bear against the bottom portion 220 of T-shaped member 87 carrying self-energizing stops 93 and 94 which are, therefore, moved in the position shown in Figure 7, thus bearing against the tape reels 25a and 26a to stop the motion of tape reel drums 25 and 26.

It is also necessary to mention the fact that since the operation of push button 37 releases push button 39 from its operative position, Y-shaped member 160 returns to its original inoperative position, that is, to the position shown in Figure 2.

In other words, when stop push button 37 is pressed down, all mechanisms of my novel tape recorder will remain as shown in Figure 2 except for the push button 37 itself and stop supporting member 87 which moves its energizing brakes 93 and 94 against the side of tape reels 25 and 26.

It is quite evident that member 87 will move in a translational movement and not in a rotational movement when push button 37 is pressed down. This is made possible by the relative positions of pin 98 and slot 97 of boss 68 and slot 90 where pins 68 and 98 permit only translational motion of member 87.

In order that movement of member 87 may not be interfered with by pin 85 of member 60, a generally rectangular shaped slot 91 is provided in the position corresponding to pin 85 in member 87.

As is seen from the drawings and as previously described in connection with Figures 9 and 10, brakes 93 and 94 are so shaped and so positioned with respect to the rotating tape reel drums 25 and 26, respectively, that any rotation of tape reel drums 25 and 26 in the counterclockwise and clockwise direction, respectively, further increases the braking action of members 93 and 94. This type of brake was, therefore, referred to before as a self-energizing brake.

When my novel tape recorder is in the position shown in Figure 7, that is, with the push button stop pressed down or in its operative position, any push button 35, 36, 38, and 39 if pressed down will release push button 37 so that it will go to its inoperative position following movements similar to the one described in connection with Figures 3, 5 and 6.

If, for example (see Figure 4), push button 36 that corresponds to record is pressed down, it will release push button 37 and simultaneously its extension 205 bearing against extension 225 of member 125 will move member 125 in a translational movement. When member 125 is thus moved, it will carry with it through engagement of pin 129 and slot 127 member 100 which as previously shown supports pads 112, 113.

When, therefore, member 100 is thus moved forward, pads 112 and 113, respectively, will push tape 32 against roller 147 and magnetic head 122, respectively, so that tape 32 will be in good contact with both roller 147 and head 122.

Since member 100 also carries pin 129 engaging circular opening 175 of member 167, when member 100 is moved in the forward direction it produces a clockwise rotation of member 167, but support 160 is secured to arm 167 through a spring 166 and, therefore, a clockwise motion of arm 167 will cause a similar clockwise motion in member 160 around its shaft 145.

At the end of this forward movement of member 100, the rotation of member 160 will be such that roller 162 carrying tape 32 will now bear with a certain amount of pressure produced by the biasing action of spring 166 against the constant speed capstan 180. The constant speed capstan 180 has the effect of controlling the speed at which tape 32 moves. Tape 32 is fed at a controlled speed by pinching the tape between capstan 180 and pinch roller 162. Pinch roller 162 also drives drum 26 by belt 280. Capstan 180 is driven by the motor while drum 26 is driven through spring belt 280 by roller 162. Simultaneously with this operation, when member 125 moves in a forward direction, being pushed by extension 205 of push button 36, it will produce a counterclockwise rotation of member 131 through engagement of its extension 136 with shoulder 130 of member 125.

Counterclockwise rotation of member 131 will cause erasing means 142 to be rotated clockwise since support 141 for erasing means 142 is connected to extension 138 of member 131 through a spring 140 and since support 141 is rotatably secured on shaft 145 for rotation around shaft 145.

It is evident, of course, and it was also previously mentioned that when erasing head 142 is so pulled downwardly it will move against the bias of spring 150. When push button 36 is pressed down, not only is key 37 or any key released but all the members of my novel tape recorder are now placed in a position for first erasing whatever information was originally recorded on the tape by means of erasing head 142 which now bears against tape 32 and then record the new information by means of recording head 122 where tape 32 during the recording operation moves from left to right as seen in Figure 4.

Lever 133 connected to lever 131 through shaft 132 will be brought into its operative position to switch an amplifier (not shown) of the tape recorder to the record position when the record push button 36 is pressed down. When the play back push button 38 is depressed, on the other hand, since lever 131 will remain inoperative, switch lever 133 will also remain inoperative and the amplifier of the tape recorder will be left in the play back position during play back operation and all other operations.

Furthermore, during the recording process the tape is made to move at a constant speed much more slowly than during the fast reverse and fast forward movements corresponding, respectively, to push buttons 35 and 39 because of the action of constant speed capstan 180 which when push button 36 is pressed down is made to cooperate with roller 162 carrying tape 32.

By this means, it is seen that no complicated clutch means of any kind are necessary to produce a relatively low speed or a relatively high speed motion of tape 32 as in previous tape recorders.

During play back or record operation, take up reel 26 is driven by roller 162 through a spring belt 280 to give a variable speed drive in record and play back positions. In these positions the feed reel 25*a* is free to rotate, being pulled by tape 32 which is being wound on take up reel 26*a*. Since the tape reel 26*a* is rotated through belt 280 because of the particular dimensions of the rollers involved, the rotation of drum 26 will be at relatively low speed in comparison with its rotation when directly driven by the motor of the tape recorder through swinging idler pulley 254 as previously described.

It is necessary to point out that when key 37 is released by pressing down key 36 braking member 87 carrying the self-energizing brakes 93 and 94 returns to its original position by the combined action of the biasing spring 95 and pin 98 in slot 97 which as previously mentioned in cooperation with boss 68 in slot 90 makes possible only translational motion for brake member 87. In other words, when key 37 is released by pressing down any other key, brake 87 is disengaged from tape reels 25*a* and 26*a* which, therefore, will start rotating again in the manner previously described.

Figure 4:
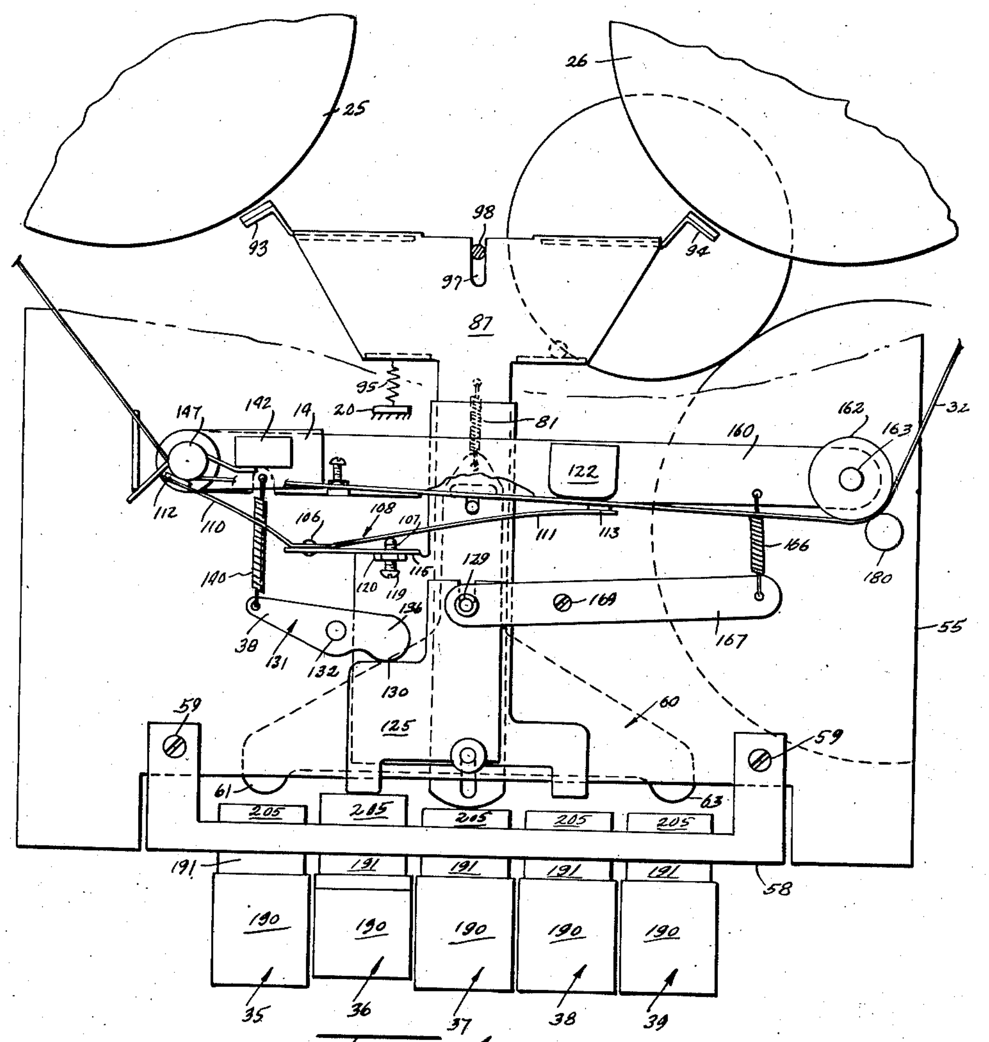
Figure 4 is another schematic diagram of my tape recorder showing my tape recorder in the record position.

If it is now desired to go from the recording operation to the play back operation, it is only necessary to press down key or push button 38 (see Figures 4 and 8).

When my novel tape recorder is in its normal position, it will have stop push button 37 depressed. This also causes idler 277 to get out of engagement with motor shaft 257 and fly wheel 275 to prevent the formation of irregularities on the rim of idler 277.

Referring finally to Figure 8 showing my novel tape recorder in its play back position when my novel tape recorder passes from the position shown in Figure 4 to the position shown in Figure 8 through operation of push button 38, key 36 is first released to bring all the operating parts in the position shown in Figure 2. Simultaneously with this, through action of extension 205 of push button 38, all the mechanisms of my novel tape recorder are brought to the position shown in Figure 8.

It is there seen in connection with Figure 11 when push button 38 is pressed down, extension 205 of V-shaped member 191 of push button 38 bears against extension 230 of member 100 to move member 100 in the forward direction by a preselected amount. The motion of member 100 is not accompanied by a similar motion of member 125 since pin 129 can freely move in a translational motion in slot 127 of member 125. In other words, since member 125 is not moved from its inoperative position, erasing head 142 remains in its inoperative position, that is, disengaged from tape 32, but motion of member 100 produces a clockwise rotation of arm 167 similar to the one described in connection with Figure 4 to pull support 160 so that roller 162 carrying tape 32 bears with a certain pressure against capstan 180, thus reducing the speed with which tape 32 moves with respect to play back or recording head 122.

When in play back position, the tape recorder amplifier will return to its play back position since now lever 133 rotatable with lever 131 will return to its original inoperative position as shown in Figure 8.

Forward motion of member 100 also causes pads 112 and 113 to move against guide post 147 and head 122, thus pressing tape 32 against post 147 and magnetic head 122, respectively, obtaining, therefore, the best possible conditions for play back.

It is to be mentioned that forward motion of member 100 is possible only when pin 85 of Y-shaped member 60 is centrally located in slot 102 so that a forward motion of member 100 only moves slot 102 with respect to pin 85 in the center leg of T-shaped slot 102. Of course, this forward motion of member 100 is limited by travel of the push buttons.

The engagement of pin 85 in T-shaped slot 102 is used to center the Y-shaped lever 60 which in its turn will center the idler lever 250 so that when in the stop position the rubber belt 259 of pulley 254 will not be in contact with either drum 26 or second idler 260. Otherwise, this condition would cause a jerking action in the tape 32 causing, therefore, wow or flutter.

When my novel tape recorder is in the position of Figure 8, the tape will move slowly from left to right as seen in Figure 8, being engaged only by play back recording head 122 and not by erasing head 142, the slow motion being provided by action of constant speed capstan 180.

In the foregoing I have described my invention solely in connection with specific illustrative embodiments thereof. Since many variations and modifications of my invention will now be obvious to those skilled in the art, I prefer to be bound not by the specific disclosures herein contained but only by the appended claims.

I claim:

1. In a tape recorder and play back device comprising two tape reels for moving a tape, a recording-play back head, a movable support for said head said support being pivotally mounted at one end, said tape driven by said reels moving with respect to said head, self-energizing brakes for stopping said reels, a T-shaped member supporting said brakes and movable in a direction parallel to its center leg, said T-shaped member having a plurality of slots in its center leg, a Y-shaped member for fast reverse and forward motion of said tape, a pivot member for said Y-shaped member, said Y-shaped member being rotatable about said pivot, said Y-shaped member carrying a pin, said Y-shaped member having a fast reverse and a fast forward position, means biasing said Y-shaped member to a neutral position intermediate between said fast reverse and said fast forward position, record and play back operating members for moving said support around its pivot, said record member having a T-shaped slot, said pin engaging said T-shaped slot through one of the said slots of the said T-shaped member, pads for engaging said tape, said pads being also operable by said play and record members, a plurality of push button means for operating, respectively, said self-energizing brakes through said T-shaped support, said Y-shaped member and said record and play back operating members, an erasing head, said erasing head preceding said play back recording head in the forward or record direction of said tape, said erasing head being rotatable around the said pivot of said recording head support and being movable into operating position by said record operating member at the activation of its push button.

2. In a tape recorder and play back device comprising two tape reels for moving a tape, a recording-play back head, a movable support for said head said support being pivotally mounted at one end, said tape driven by said reels moving with respect to said head, self-energizing brakes for stopping said reels, a T-shaped member supporting said brakes and movable in a direction parallel to its center leg, said T-shaped member having a plurality of slots in its center leg, a Y-shaped member for fast reverse and forward motion of said tape, a pivot member for said Y-shaped member, said Y-shaped member being rotatable about said pivot, said Y-shaped member carrying a pin, said Y-shaped member having a fast reverse and a fast forward position, means biasing said Y-shaped member to a neutral position intermediate between said fast reverse and said fast forward position, record and play back operating members for moving said support around its pivot, said record member having a T-shaped slot, said pin engaging said T-shaped slot through one of the said slots of the said T-shaped member, activation of said Y-shaped member causing said pin to move into the lateral sections of said T-shaped slot to lock said play and record members in their inoperative position, activation of said play and record operating members moving said T-shaped slot with respect to said pin and locking said Y-shaped member in its intermediate or neutral position, pads for engaging said tape, said pads being also operable by said play and record operating members, a plurality of push button means for operating, respectively, said self-energizing brakes, said Y-shaped member and said record and play back operating members, said push buttons comprising latching means for releasing any of said push buttons at the activation of one of them; an erasing head, said erasing head preceding said play back recording head in the forward or record direction of said tape, said erasing head being rotatable around the said pivot of said recording head support and being movable into operating position by said record operating member at the activation of its push button.

3. In a tape recorder and play back device comprising two tape reels for moving a tape, a recording-play back head, a movable support for said head said support being pivotally mounted at one end, an idler roller carried by said support, said tape driven by said reels moving with respect to said head, self-energizing brakes for stopping said reels, a T-shaped member supporting said brakes and movable in a direction parallel to its center leg, a Y-shaped member for fast reverse and forward motion of said tape, a pivot member for said Y-shaped member, said Y-shaped member being rotatable about said pivot, said Y-shaped member having a pin, said Y-shaped member having a fast reverse and a fast forward position, means biasing said Y-shaped member to a neutral position intermediate between said fast reverse and said fast forward positions, record and play back operating members for moving said support around its pivot, a second roller mounted on said end of said support, said tape moving in close contact with said idler and said second roller, said record operating member having a T-shaped slot, said pin engaging said T-shaped slot through one of the said slots of the said T-shaped member, activation of said Y-shaped member causing said pin to move into the lateral sections of said T-shaped slot to lock said play and record operating members in their inoperative position, activation of said play and record operating members moving said T-shaped slot with respect to said pin and locking said Y-shaped member in its inoperative or neutral position, pads for engaging said tape at said recording and play back head and at said second roller, said pads being also operable by said play and record operating members, a plurality of push button means for operating, respectively, said self-energizing brakes, said Y-shaped member and said record and play back operating members, said push buttons comprising latching means for releasing any of said push buttons at the activation of one of them, an erasing head, said erasing head preceding said play back recording head in the forward or record direction of said tape, said erasing head being rotatable around the said pivot of said recording head support and being movable into operating position by said record operating member at the activation of its push button.

4. In a tape recorder and play back device comprising two tape reels for moving a tape, a recording-play back head, a movable support for said head, said support being pivotally mounted at one end, an idler roller carried by said support, said tape driven by said reels moving with respect to said head, self-energizing brakes for stopping said reels, a T-shaped member supporting said brakes and movable in a direction parallel to its center leg, said T-shaped member having a plurality of slots in its center leg, a Y-shaped member for fast reverse and forward motion of said tape, a pivot member for said Y-shaped member, said Y-shaped member being rotatable about said pivot, said Y-shaped member carrying a pin, said Y-shaped member having a fast reverse and a fast forward position, means biasing said Y-shaped member to a neutral position intermediate between said fast reverse and said fast forward position, record and play back operating members for moving said support around one of its ends, a second roller, said tape moving in close contact with said idler and said second roller, a flywheel having a capstan, the motion of said support in one direction causing said idler to bear against said capstan to control the motion of said tape while said tape is moving between said idler roller and said capstan, the motion of said support in the opposite direction causing the disengagement of said idler from said capstan, said record member having a T-shaped slot, said pin engaging said T-shaped slot through one of the said slots of the said T-shaped member, activation of said Y-shaped member causing said pin to move into the lateral sections of said T-shaped slot to lock said play and record operating members in their inoperative position, activation of said play and record operating members moving said T-shaped slot with respect to said pin, pads for engaging said tape, said pads being also operable by said play and record operating members, a plurality of push button means for operating, respectively, said self-energizing brakes, said Y-shaped member and said record and play back operating members, said push buttons comprising latching means for releasing any of said push buttons at the activation of one of them, an erasing head, said erasing head preceding said play back recording head in the forward or record direction of said tape, said erasing head being rotatable about the pivot of said recording head support and being movable into operating position by said record member at the activation of its push button.

5. In a tape recorder and play back device comprising two tape reels for moving a tape, a recording-play back head, a movable support for said head, said support being pivotally mounted at one end, an idler roller carried by said support, said tape driven by said reels moving with respect to said head, self-energizing brakes for stopping said reels, a T-shaped member supporting said brakes and movable in a direction parallel to its center leg, said T-shaped member having a plurality of slots in its center leg, a Y-shaped member for fast reverse and forward motion of said tape, a pivot member for said Y-shaped member, said Y-shaped member being rotatable about said pivot, said Y-shaped member carrying a pin, said Y-shaped member having a fast reverse and a fast forward position, means biasing said Y-shaped member in its neutral position intermediate between said fast reverse and said fast forward position, record and play back operating members for moving said support around one of its ends, a second roller mounted on said end of said support, said tape moving in close contact with said idler and said second roller, a flywheel having a capstan, the motion of said support in one direction causing said idler to bear against said capstan to control the motion of said tape while said tape is moving between said idler roller and said capstan, the motion of said support in the opposite direction causing the disengagement of said idler from said capstan, said record operating member having a T-shaped slot, said pin engaging said T-shaped slot through one of the said slots of the said T-shaped member, activation of said Y-shaped member causing said pin to move into the lateral sections of said T-shaped slot to lock said play and record operating members in their inoperative position, activation of said play and record operating members moving said T-shaped slot with respect to said pin, pads for engaging said tape, said pads being also operable by said play and record operating members, a plurality of push button means for operating respectively said self-energizing brakes, said Y-shaped member and said record and play back operating members, said push buttons comprising latching means for releasing any of said push buttons at the activation of one of them, said latching means comprising a V-shaped member rigidly secured on one leg to each of said push buttons and rotatable around their apex, a biased surface having a curved portion, said other leg of said V-shaped member bearing against said biased surface at activation of its corresponding push button to release the other V-shaped members and their corresponding push buttons and to be latched at the end of its travel by the end of said biased surface; an erasing head, said erasing head preceding said play back recording head in the forward or record direction of said tape, said erasing head being rotatable around the same pivoted point of said recording head support and being movable into operating position by said record member at the activation of its push button.

6. In a tape recorder and play back device comprising two tape reels for moving a tape, a recording-play back head, a movable support for said head, said support being pivotally mounted at one end, an idler roller carried by said support, said tape driven by said reels moving with respect to said head, self-energizing brakes for stopping said reels, a T-shaped member supporting said brakes and movable in a direction parallel to its center leg, said T-shaped member having a plurality of slots in its center leg, a Y-shaped member having a position for fast reverse and a position for forward motion of said tape, said Y-shaped member carrying a pin, said Y-shaped member having a fast reverse and a fast forward position, means biasing said Y-shaped member in its neutral position intermediate between said fast reverse and said fast forward position, record and play back operating members for moving said support about its pivotal mounting, a second roller mounted on said end of said support, said tape moving in close contact with said idler and said second roller, a flywheel having a capstan, the motion of said support in one direction causing said idler to bear against said capstan to control the motion of said tape while said tape is moving between said idler roller and said capstan, the motion of said support in the opposite direction causing the disengagement of said idler from said capstan, said record operating member having a T-shaped slot, said pin engaging said T-shaped slot through one of the said slots of the said T-shaped member, activation of said Y-shaped member causing said pin to move into the lateral sections of said T-shaped slot to lock said play and record operating members in their inoperative position, activation of said play and record members moving said T-shaped slot with respect to said pin, pads for engaging said tape, said pads being also operable by said play and record operating members, a plurality of push button means for operating respectively said self-energizing brakes, said Y-shaped member and said record operating and play back members, said push buttons comprising latching means for releasing any of said push buttons at the activation of one of them, an erasing head, said erasing head preceding said play back recording head in the forward or record driection of said tape, said erasing head being rotatable about the pivot of said recording head support and being movable into operating position by said record operating member at the activation of its push button, biasing means for returning said erasing head to its inoperative position at the deactivation of its push button, a base and a cover completely housing said tape recorder and play back device.

7. In a tape recorder and play back device comprising two tape reels for moving a tape, a recording-play back head, a movable support for said head, said support being pivotally mounted at one end an idler roller carried by said support, a spring belt connecting one of said reels with said idler roller, said tape driven by said reels moving with respect to said head, self-energizing brakes for stopping said reels, a T-shaped member supporting said brakes and movable in a direction parallel to its center leg, said T-shaped member having a plurality of slots in its center leg, a Y-shaped member for fast reverse and forward motion of said tape, said Y-shaped member carrying a pin, said Y-shaped member having a fast reverse and a fast forward position, means biasing said Y-shaped member to its neutral position intermediate between said fast reverse and said fast forward position, record and play back operating members for moving said support about its pivotal mounting, a second roller mounted on said end of said support, said tape moving in close contact wtih said idler and said second roller, a flywheel having a capstan, the motion of said support in one direction causing said idler to bear against said capstan to control the motion of said tape while said tape is moving between said idler roller and said capstan, the motion of said support in the opposite direction causing the disengagement of said idler from said capstan, said record operating member having a T-shaped slot, said pin engaging said T-shaped slot through one of the said slots of the said T-shaped member, activation of said Y-shaped member causing said pin to move into the lateral sections of said T-shaped slot to lock said play and record operating members in their inoperative position, activation of said play and record operating members moving said T-shaped slot with respect to said pin, pads for engaging said tape, said pads being also operable by said play and record operating members, a plurality of push button means for operating respectively said self-energizing brakes, said Y-shaped member and said record and play back operating members, said push buttons comprising latching means for releasing any of said push buttons at the activation of one of them, an erasing head, said erasing head preceding said play back recording head in the forward or record direction of said tape, said erasing head being rotatable about the pivot of said recording head support and being movable into operating position by said record operating member at the activation of its push button, biasing means for returning said erasing head to its inoperative poistion at the deactivation of its push button, a base and a cover completely housing said tape recorder and play back device, means biasing said T-shaped member in its inoperative position.

References Cited in the file of this patent

UNITED STATES PATENTS

| | | |
|---|---|---|
| 2,438,045 | Gerhardt | Mar. 16, 1948 |
| 2,484,082 | Essig | Oct. 11, 1949 |
| 2,504,587 | Rey | Apr. 18, 1950 |
| 2,535,486 | Dank | Dec. 26, 1950 |
| 2,538,892 | Begun | Jan. 23, 1951 |
| 2,538,893 | Begun | Jan. 23, 1951 |
| 2,542,590 | Stone | Feb. 20, 1951 |
| 2,555,643 | Harrison | June 5, 1951 |
| 2,639,333 | Howell | May 19, 1953 |
| 2,645,495 | Nelson | July 14, 1953 |
| 2,706,637 | Cain | Apr. 19, 1955 |